United States Patent
Lee et al.

(10) Patent No.: US 9,654,037 B2
(45) Date of Patent: May 16, 2017

(54) MULTI-PHASE MOTOR CONTROL METHOD AND DEVICE USING THE SAME

(71) Applicants: Kuo-Chung Lee, New Taipei (TW); Wei-Hsu Chang, New Taipei (TW); An-Tung Chen, Pingzhen (TW); Chun-Wen Wang, Zhubei (TW)

(72) Inventors: Kuo-Chung Lee, New Taipei (TW); Wei-Hsu Chang, New Taipei (TW); An-Tung Chen, Pingzhen (TW); Chun-Wen Wang, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 218 days.

(21) Appl. No.: 14/461,918

(22) Filed: Aug. 18, 2014

(65) Prior Publication Data
US 2015/0069940 A1    Mar. 12, 2015

(30) Foreign Application Priority Data
Sep. 11, 2013    (TW) .............................. 102132710 A

(51) Int. Cl.
*H02P 6/06* (2006.01)
*H02P 6/182* (2016.01)

(52) U.S. Cl.
CPC ..................................... *H02P 6/182* (2013.01)

(58) Field of Classification Search
CPC ........ H02P 6/182; H02P 21/22; H02P 25/089; H02P 21/00
USPC .............. 318/400.06, 400.2, 400.26, 400.34, 318/400.35, 268
See application file for complete search history.

(56) References Cited

U.S. PATENT DOCUMENTS

| | | | | |
|---|---|---|---|---|
| 4,528,486 A | * | 7/1985 | Flaig | H02P 6/085 318/400.21 |
| 5,254,926 A | * | 10/1993 | Miller | H02P 27/10 318/798 |
| 5,287,051 A | * | 2/1994 | Konrad | B60L 11/1803 318/803 |
| 5,491,393 A | | 2/1996 | Uesugi | |

(Continued)

FOREIGN PATENT DOCUMENTS

| | | |
|---|---|---|
| CN | 1237698 C | 1/2006 |
| CN | 101257271 B | 11/2010 |

*Primary Examiner* — Bentsu Ro
*Assistant Examiner* — Thai Dinh
(74) *Attorney, Agent, or Firm* — Tung & Associates

(57) ABSTRACT

A multi-phase motor control method controls a multi-phase motor which includes multiple nodes respectively receiving a corresponding number of driving voltage signals to control a rotation of a rotor. The motor control method includes: sensing a signal phase of a current signal corresponding to at least one node, for example by sensing a zero-crossing point of the current signal; determining a reference phase for the current signal; calculating a phase difference between the signal phase and the reference phase; and controlling a phase switching frequency of the stator according to the phase difference, such that the signal phase is close to or in phase with the reference phase, to thereby obtain an optimum rotation speed of the rotor corresponding to a given driving voltage. The present invention also provides a multi-phase motor control device using the motor control method.

15 Claims, 17 Drawing Sheets

(56) References Cited

U.S. PATENT DOCUMENTS

| | | | | |
|---|---|---|---|---|
| 6,636,011 | B2* | 10/2003 | Sadasivam | H02P 23/26 318/727 |
| 7,034,478 | B2 | 4/2006 | Bhaumik et al. | |
| 7,643,733 | B2* | 1/2010 | El-Antably | H02P 6/10 318/700 |
| 8,093,847 | B2 | 1/2012 | Otaguro | |
| 2002/0190685 | A1* | 12/2002 | Sadasivam | H02P 23/26 318/727 |
| 2004/0130287 | A1* | 7/2004 | Sadasivam | H02P 23/08 318/799 |
| 2006/0055352 | A1* | 3/2006 | Mori | H02P 6/10 318/432 |
| 2008/0201041 | A1* | 8/2008 | Jiang | H02P 21/04 701/42 |

* cited by examiner

MULTI-PHASE MOTOR CONTROL METHOD AND DEVICE USING THE SAME

CROSS REFERENCE

The present invention claims priority to TW 102132710, filed on Sep. 11, 2013.

BACKGROUND OF THE INVENTION

Field of Invention

The present invention relates to a multi-phase motor control method, especially a method for controlling a phase switching frequency of a multi-phase motor according to a phase difference, and a multi-phase motor using the method.

Description of Related Art

FIG. 1A shows a control circuit of a y-connection 3-phase sensor-less permanent magnet synchronous motor, and FIGS. 1B-1C show its operation process. The horizontal coordinates 0° to 360° indicate an electrical cycle of the motor stator, and the vertical coordinates Vu, Vv, and Vw respectively indicate the voltages corresponding to nodes Vu, Vv, and Vw of FIG. 1A; that is, Vu, Vv, and Vw are the driving voltage signals sensed at the three nodes of the 3-phase motor. The curve Vc in a zigzag shape shown in FIGS. 1B-1C indicates the voltage at the neutral node Vc of FIG. 1A. (Vu, Vv, Vw and Vc are used to refer to the nodes or the voltages at the nodes, according to the context.)

Taking the six-step square-wave diving method as an example, the phase switching timing of the 3-phase sensor-less permanent magnet synchronous motor is determined according to zero-crossing points (Pz, FIGS. 1B-1C) between a back electromotive force (BEMF) and floating phase voltages at nodes Vu, Vv, and Vw. When the zero-crossing points are sensed, the phase switching of the 3-phase sensor-less permanent magnet synchronous motor is ready to perform. For example, referring to FIGS. 1A-1C, in the stage from 0° through 60°, the node Vu charges the node Vv through the neutral node Vc, and the node Vw is floating. The voltage Vw is compared with the voltage Vc, and when the zero-crossing point Pz is detected, the phase switching is performed after another 30° from the zero-crossing point Pz. Afterward, in the stage from 60° through 120°, the node Vu charges the node Vw through the neutral node Vc, and the node Vv is floating. The voltage Vv is compared with the voltage Vc, and when the zero-crossing point Pz is detected, the phase switching is performed after another 30° from the zero-crossing point Pz. An electrical cycle from 0° through 360° is completed by repeating the aforementioned steps for different nodes. Such phase switching mechanism by detecting the zero-cross point between a floating phase and the BEMF is applicable even when the rotation speed is controlled by a pulse width modulation (PWM) method, or when a soft-switching method is used to trim a phase current into a quasi-sinusoidal waveform, except that the range for detecting the zero-crossing point Pz is different.

The rotation of the motor is generated by a torque and the torque is generated by an interaction between the electromagnetic field of the stator and the permanent magnetic field of the rotor. For a motor to operate with low noise, the magnetizing field on the permanent magnet needs to be a sinusoidal waveform, and the induced BEMF in each phase coil also needs to be a sinusoidal waveform; furthermore, the phase current also needs to be a sinusoidal waveform and should be in phase with the BEMF, so that the motor can operate by an optimal efficiency. If the floating phases are used to sense the zero-crossing points with the BEMF, every phase needs to be floating in turn and its current in the floating period is zero; hence, the phase current can not be a sinusoidal current waveform, and the torque generated by the interaction between the electromagnetic field generated from the stator and the permanent magnetic field of the rotor will present a transient imbalance, resulting in vibrations and noises during phase switching. Although there are techniques such as quasi-sinusoidal waveform signal processing that can reduce the phase switching noises by narrowing the floating time period, there are still considerable noises which can be troublesome in a quiet environment or in a place demanding high quietness such as in a library.

U.S. Pat. Nos. 8,093,847, 7,034,478, and 5,491,393 disclose different solutions for lowering noises during motor phase switching; however, the noises due to floating phases are still unsolved.

SUMMARY OF THE INVENTION

The present invention discloses a multi-phase motor control method and a device using this control method.

In one perspective of the present invention, a multi-phase motor control method is provided. The multi-phase motor includes multiple nodes which respectively receive a corresponding number of driving voltage signals to control a rotation of a rotor in the multi-phase motor. The multi-phase motor control method includes: sensing a current signal corresponding to one of the plurality of nodes and detecting a signal phase of the current signal; comparing the signal phase of the current signal with a reference phase of a desired target current signal to determine a phase difference; and controlling a rotation speed of the rotor according to the comparing result.

In one embodiment of the present invention, the driving voltage signals are sinusoidal driving voltage signals, or space vector pulse width modulation signals.

In one embodiment of the present invention, the step of comparing the signal phase of the current signal with a reference phase of a desired target current signal to determine a phase difference comprises: detecting a zero-crossing point between the current signal and a ground; determining a zero-crossing point of the desired target current signal; and calculating a time difference between the zero-crossing points of the current signal and the desired target current signal to determine the phase difference.

In the aforementioned embodiment, preferably, the zero-crossing point of the desired target current signal is equal to a zero-crossing point between the driving voltage signal corresponding to the current signal and the ground plus a predetermined value.

In another embodiment, the step of comparing the signal phase of the current signal with a reference phase of a desired target current signal to determine a phase difference comprises: detecting a differential zero-crossing point between the current signal and another current signal corresponding to another node, wherein the differential zero-crossing point between the two current signals is an intersection between the two current signals; determining a differential zero-crossing point between the desired target current signal and another desired target current signal which correspond to the two current signals, wherein the differential zero-crossing point between the two desired target current signals is an intersection between the two desired target current signals; and calculating a time difference between the differential zero-crossing point between the two current signals and the differential zero-crossing point between the two desired target current signals to determine the phase difference.

In the aforementioned embodiment, preferably, the differential zero-crossing point between the two desired target current signals is equal to a differential zero-crossing point between two of the driving voltage signals corresponding to the two current signals plus a predetermined value, wherein the differential zero-crossing point between two of the driving voltage signals is an intersection between the two driving voltage signals.

In the aforementioned embodiments, preferably, the predetermined value is an internal constant or a sum of the internal constant and either a positive safety tolerance or a negative safety tolerance, and the internal constant is equal to an equivalent inductance of a wiring connected to the corresponding node divided by an equivalent resistance of the wiring.

In one embodiment, the step of controlling a rotation speed of the rotor according to the comparing result includes: increasing the rotation speed of the rotor by increasing phase switching frequencies of the driving voltage signals when the signal phase of the current signal is behind the reference phase of the desired target current signal; or decreasing the rotation speed of the rotor by decreasing phase switching frequencies of the driving voltage signals when the signal phase of the current signal is ahead of the reference phase of the desired target current signal.

In one embodiment, the multi-phase motor control method further includes: activating the multi-phase motor; and performing the step of sensing the current signal corresponding to one of the plurality of nodes after it is confirmed that the rotor has started rotating.

In one embodiment, the multi-phase motor control method further includes: activating the multi-phase motor; sensing the rotation speed of the rotor; and performing the step of sensing the current signal corresponding to one of the plurality of nodes after the rotation speed reaches a predetermined speed.

In one embodiment, preferably, the multi-phase motor control method further includes: controlling a phase switching frequency of at least one of the driving voltage signals according to the comparison result of comparing the signal phase of the current signal and the reference phase of the desired target current signal, such that a zero-crossing point of the current signal is close to or in phase with a zero-crossing point of the desired target current signal, wherein the zero-crossing point of the desired target current signal is set to be larger than a zero-crossing reference point plus an internal constant of the multi-phase motor; and judging that the multi-phase motor is locked when the phase switching frequency of the driving voltage signal declines to a threshold value.

In one embodiment, preferably, the multi-phase motor control method further includes: controlling a phase switching frequency of at least one of the driving voltage signals according to the comparison result of comparing the signal phase of the current signal and the reference phase of the desired target current signal, such that a zero-crossing point of the current signal is close to or in phase with a zero-crossing point of the desired target current signal, wherein the zero-crossing point of the desired target current signal is set to be smaller than a zero-crossing reference point plus an internal constant of the multi-phase motor; and judging that the multi-phase motor is locked when the phase switching frequency of the driving voltage signal rises to a threshold value.

In another perspective, the present invention provides a multi-phase motor control method for controlling a multi-phase motor which includes a plurality of nodes respectively receiving a corresponding number of driving voltage signals to control a rotation of a rotor in the multi-phase motor, the multi-phase motor control method comprising: sensing a current signal and the driving voltage signal corresponding to at least one node; calculating a phase difference between the current signal and the driving voltage signal; comparing the phase difference with a predetermined phase difference and controlling a phase switching frequency of the driving voltage signal according to the comparison result, such that the phase difference between the driving voltage signal and the current signal is close to or in phase with the predetermined phase difference, wherein the predetermined phase difference is larger than a predetermined value; and judging that the multi-phase motor is locked when the phase switching frequency of the driving voltage signal declines to a threshold value.

In another perspective, the present invention provides a multi-phase motor control method for controlling a multi-phase motor which includes a plurality of nodes respectively receiving a corresponding number of driving voltage signals to control a rotation of a rotor in the multi-phase motor, the multi-phase motor control method comprising: sensing a current signal and the driving voltage signal corresponding to at least one nodes; calculating a phase difference between the current signal and the driving voltage signal; comparing the phase difference with a predetermined phase difference and controlling a phase switching frequency of the driving voltage signal according to the comparison result, such that the phase difference between the driving voltage signal and the current signal is close to or in phase with the predetermined phase difference, wherein the predetermined phase difference is smaller than a predetermined value; and judging that the multi-phase motor is locked when the phase switching frequency of the driving voltage signal rises to a threshold value.

In another perspective, the present invention provides a multi-phase motor control device, coupled to a multi-phase motor with a plurality of nodes respectively receiving a corresponding number of driving voltage signals to control a rotation of a rotor in the multi-phase motor, the multi-phase motor control device comprising: a zero-crossing point detector, for receiving a current signal of one of the phases and detecting a zero-crossing point between the current signal and a ground; a phase time calculator, for calculating a time difference between the zero-crossing point of the current signal and a zero-crossing point between a desired target current signal and the ground to obtain a phase difference between the current signal and the desired target current signal, and generating a frequency adjusting signal according to the phase difference; and a driver, for controlling control a rotation speed of the rotor according to the frequency adjusting signal.

In another perspective, the present invention provides a multi-phase motor control device, coupled to a multi-phase motor with three nodes respectively receiving three corresponding driving voltage signals to control a rotation of a rotor of the multi-phase motor, the multi-phase motor control device comprising: a differential zero-crossing point detector, for detecting a differential zero-crossing point of two current signals of two phases, wherein the differential zero-crossing point of the two current signals is an intersection between the two current signals; a phase time calculator, for calculating a differential time difference between the differential zero-crossing point of the two current signals and a differential zero-crossing point of two desired target current signals corresponding to the two current signals to obtain a phase difference, and generating a frequency adjusting signal according to the phase difference, wherein the differential zero-crossing point of the two desired target current signals is an intersection between the two desired target current signals; and a driver, for controlling a rotation speed of the rotor according to the frequency adjusting signal.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, to show the interrelationships between the circuits and/or devices, but not drawn according to actual scale. The orientation wordings in the description such as: above, under, left, or right are for reference with respect to the drawings, but not for limiting the actual product made according to the present invention.

The multi-phase motor of the present invention is illustrated with a 3-phase motor as an example; however, the multi-phase motor of the present invention can be implemented for a motor of any plural number of phases and is not limited to the 3-phase motor.

Figure 1A:
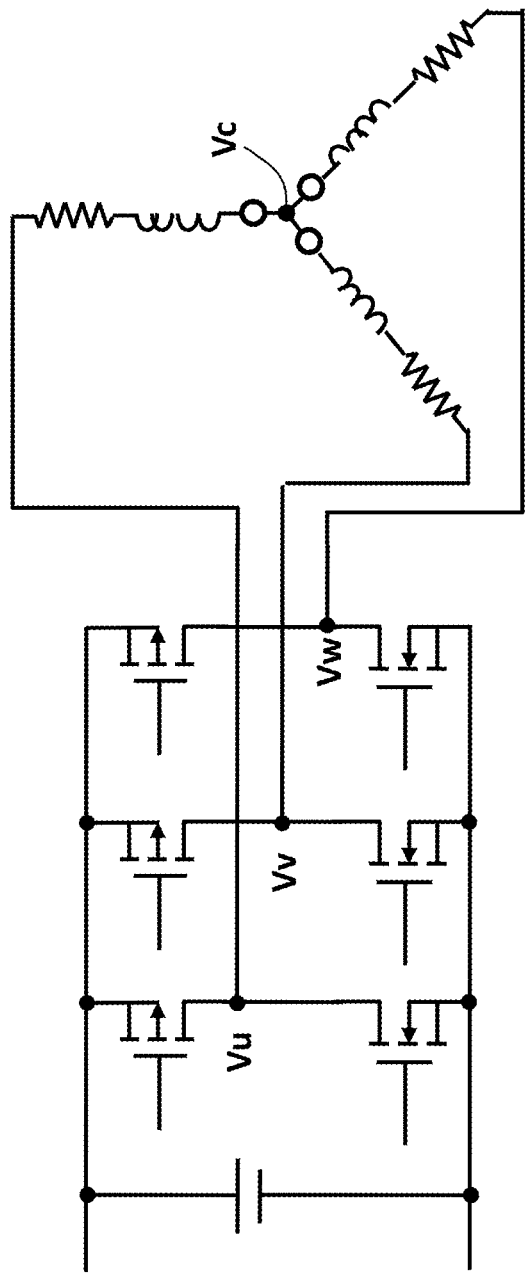
FIGS. 1A-1C show a prior art 3-phase motor control device and the relationships among the driving voltage signals therein.
Figure 1B:
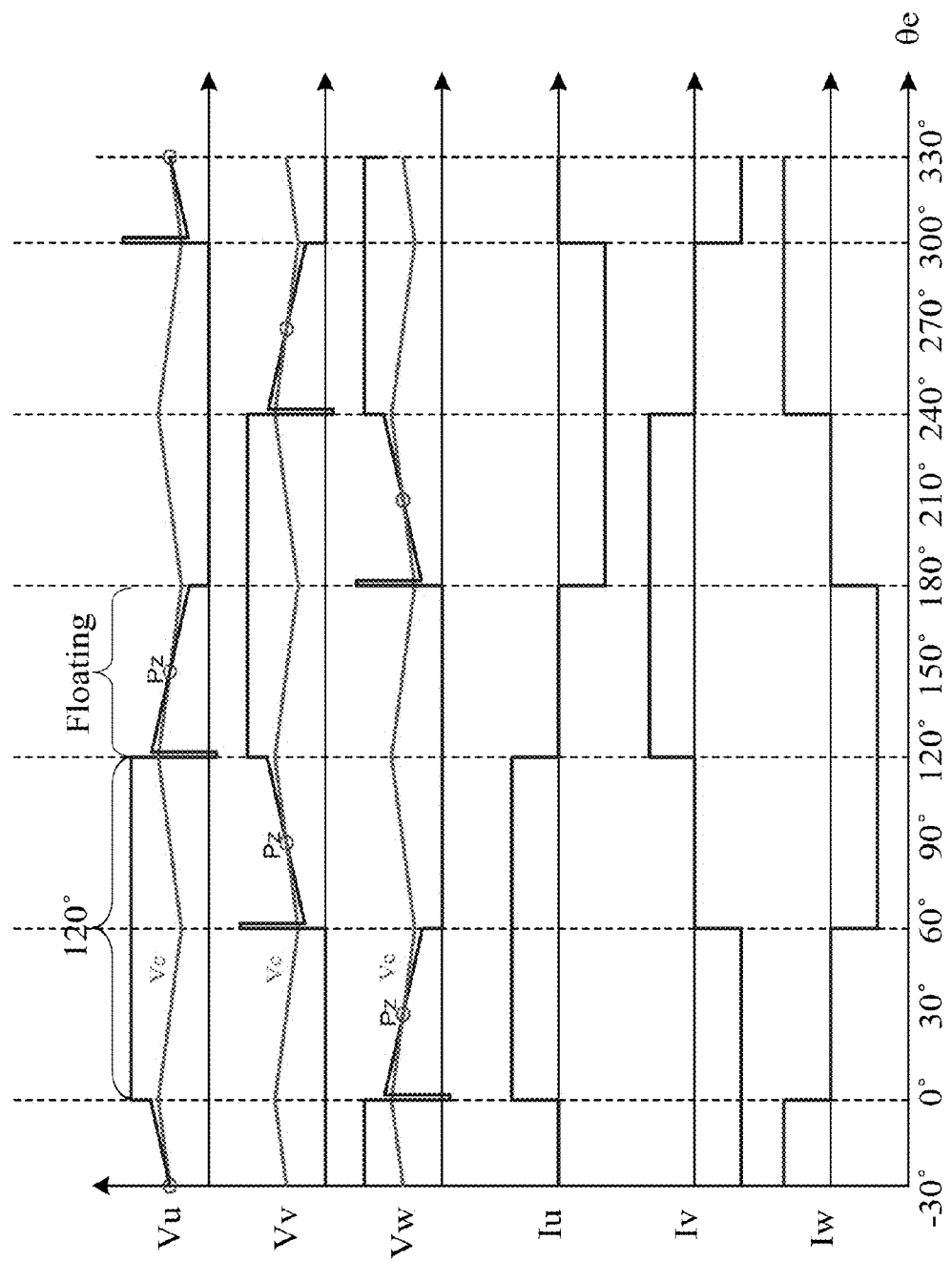
Figure 1C:
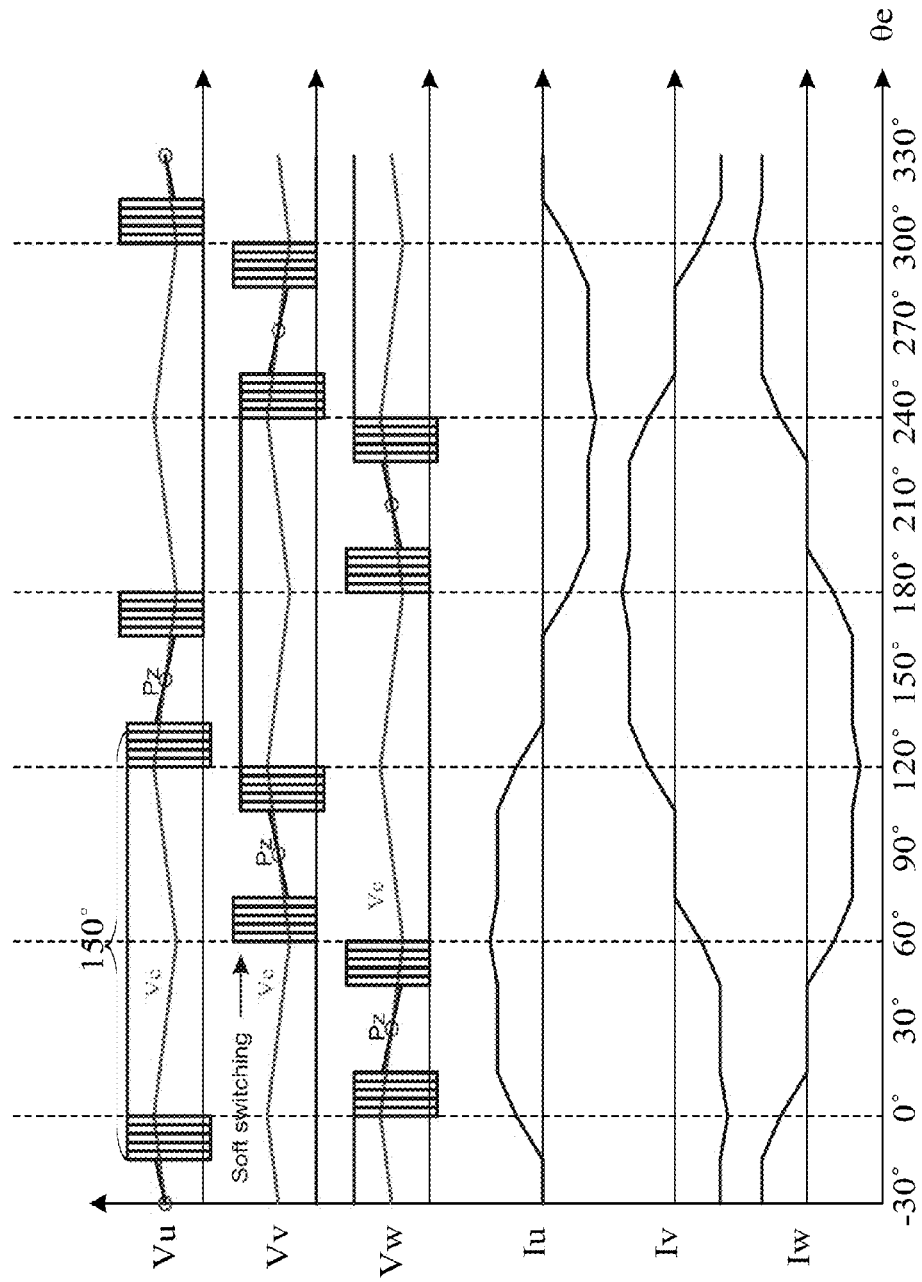
Figure 2:
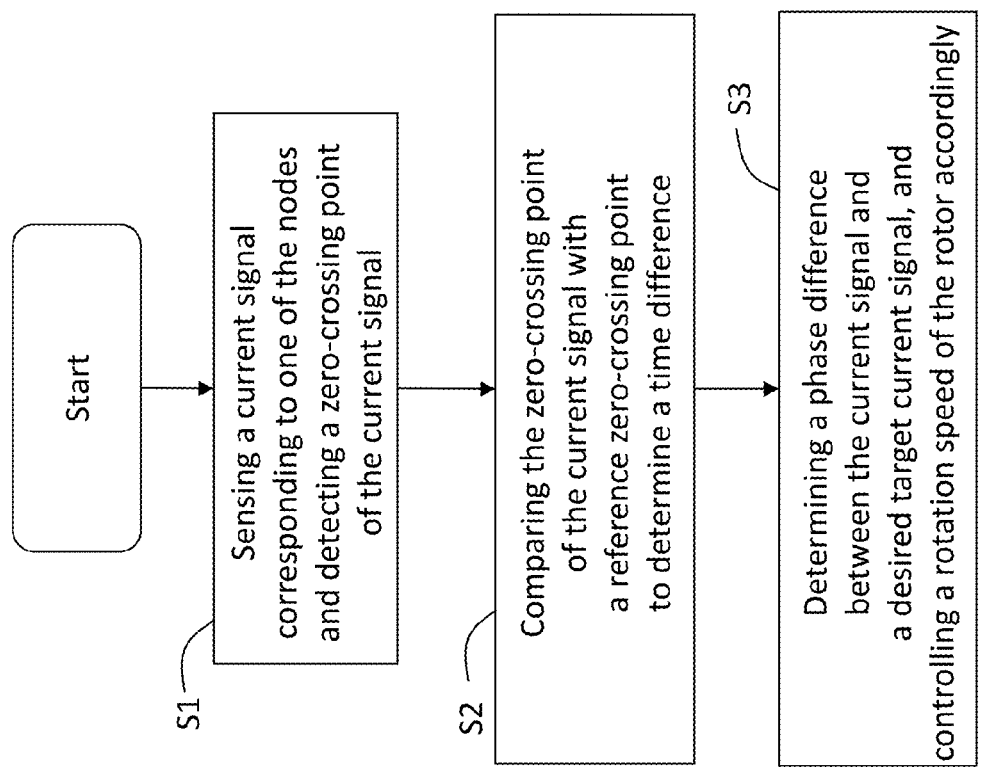
FIG. 2 shows a multi-phase motor control method according to an embodiment of the present invention.

FIG. 2 shows a multi-phase motor control method according to a perspective of the present invention, which is used to control a phase switching operation of the 3-phase motor. The 3-phase motor includes three nodes (Vu, Vv, and Vw, FIG. 1) to respectively receive three driving voltage signals Vu, Vv, and Vw for controlling a rotation of a rotor in the multi-phase motor. The multi-phase motor control method includes the following steps. First, the method senses a current signal corresponding to one of the plurality of nodes and detecting a signal phase of the current signal; more specifically, in one embodiment, this step is done by sensing a current signal corresponding to one of the nodes and detecting a zero-crossing point of the current signal (S1). Next, the method compares the sensed signal phase of the current signal with a reference phase of a desired target current signal to determine a phase difference; more specifically, in one embodiment, this step is done by comparing the zero-crossing point of the current signal with a zero-crossing reference point to determine a time difference (S2), and determining a phase difference between the current signal and a desired target current signal according to the time difference (S3). Next, the method controls a rotation speed of the rotor according to the comparing result; more specifically, in one embodiment, this step is done by controlling a rotation speed of the rotor of the motor according to the phase difference (S3). Note that "the zero-crossing point of the current signal" can be an absolute zero-crossing point with reference to ground or a relative (differential) zero-crossing point at which the sensed current signal crosses a current signal of another phase. More details of the steps will be explained below with reference to signal waveforms.

FIGS. 3A-3D show the relationships among the signals in the multi-phase motor control method according to an embodiment of the present invention. The reference characters Vu, Vv, and Vw indicate the driving voltage signals sensed at the three nodes of the 3-phase motor, respectively, and the reference characters Iu, Iv, and Iw indicate the current signals of the phases corresponding to the driving voltage signals Vu, Vv, and Vw respectively.

Figure 3A:
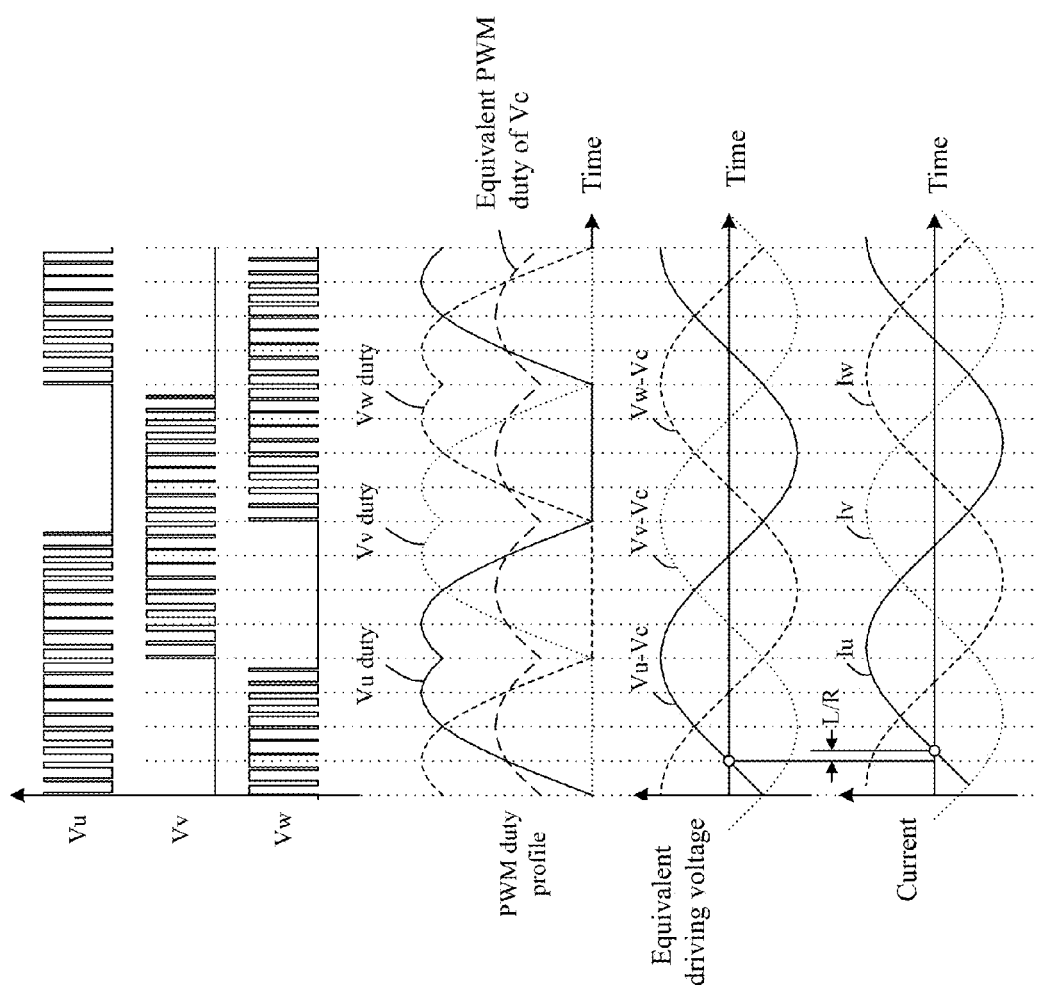
FIGS. 3A-3D show the relationships of various signals in the multi-phase motor control method according to an embodiment of the present invention.

FIG. 3A shows the relationships among the driving voltage signals and the current signals when the rotor is motionless (for example, when the rotor is about to start rotation, or when the rotor locked). By the effect of the equivalent inductance (L) and the equivalent resistance (R) of the wiring (FIG. 1, the wirings between nodes the Vu, Vv, and Vw and the neutral node Vc (or a equivalent neutral node in a Δ-connection motor)), the current signals Iu, Iv, and Iw is behind the driving voltage signals Vu, Vv, Vw by a delay time, and the delay time is about equal to L/R when the rotor is motionless. This delay time can be obtained by calculation or by measurement during circuit operation, for example, the delay time can be obtained by comparing the zero-crossing point of the driving voltage signal with reference to ground and the zero-crossing point of the current signal with reference to ground. L/R can be regarded as an internal constant; when the rotor is motionless, the delay time is about equal to this internal constant. When the rotor starts rotating and has a rotation speed, the delay time changes according to the rotation speed.

Still referring to FIG. 3A, the step S1 can sense any one of the current signals Iu, Iv, and Iw and detect its zero-crossing point with reference to ground, and correspondingly, the step S2 calculates a time difference between the zero-crossing point of the sensed current signal Iu, Iv, or Iw and a zero-crossing reference point. In FIG. 3A, the zero-crossing reference point is the zero-crossing point of the corresponding driving voltage signal Vu, Vv, or Vw with reference to ground. When the time difference between the zero-crossing point of the sensed current signal and the zero-crossing reference point is equal to a predetermined value (such as the aforementioned internal constant L/R or other predetermined values, to be described later), it is known that there is no phase difference between the sensed current signal and the desired target current signal (in the present case because the rotor is motionless), and the rotation speed of the rotor can be correspondingly controlled (step S3). Note that when the rotor is motionless, the rotor may possibly be locked, and the present invention provides a method to determine whether the rotor is locked and a solution to this, which will be described in detail later.

Figure 3B:
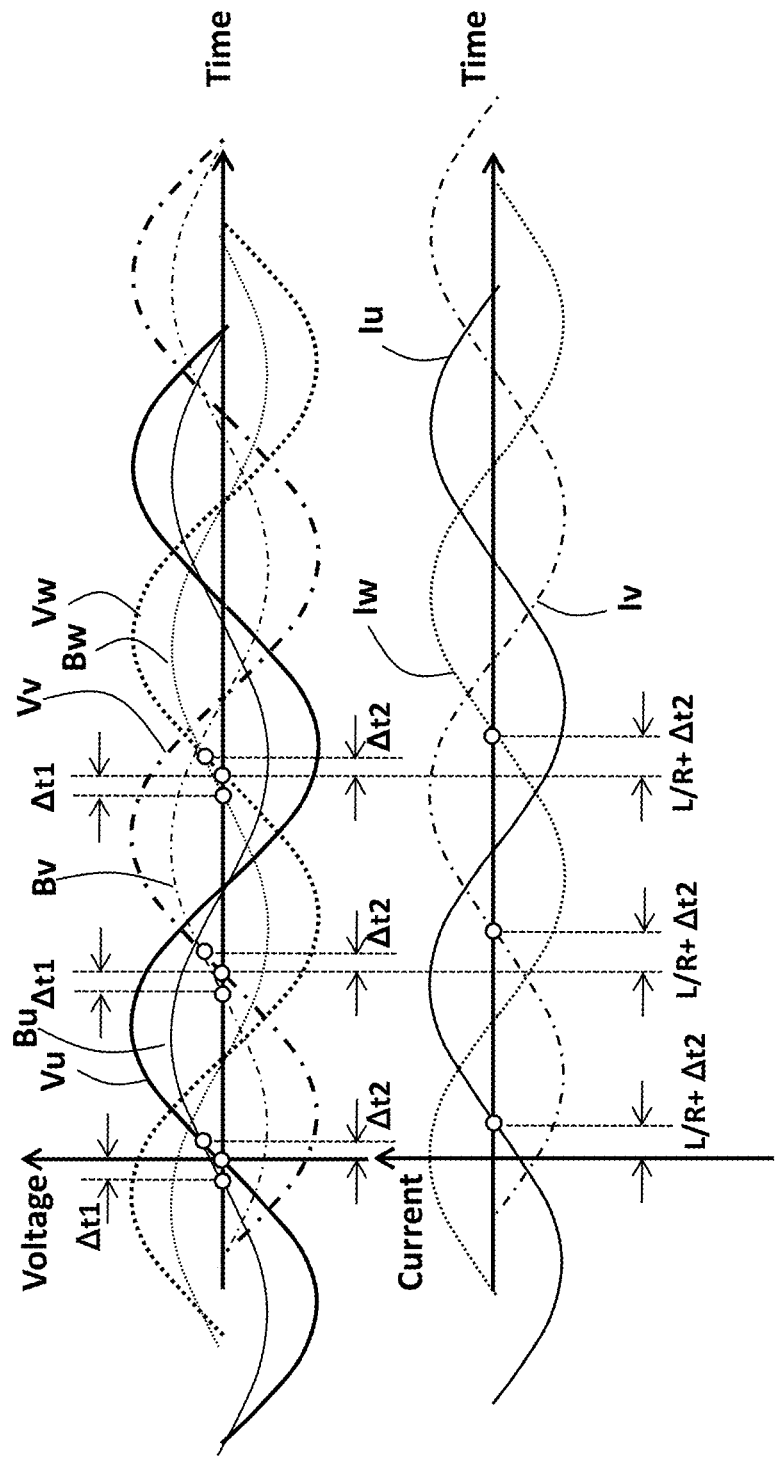

FIG. 3B shows the relationships among the driving voltage signals Vu, Vv, and Vw and the current signals Iu, Iv, and Iw when the rotation speed of the rotor is lower than the highest drivable speed that the driving voltage signals Vu, Vv, and Vw can afford. The rotation of the rotor induces BEMFs Bu, Bv, and Bw due to electromagnetic field effect. The phases of the BEMFs Bu, Bv, and Bw are ahead of the driving voltage signals Vu, Vv, and Vw when the rotation speed of the rotor is lower than the highest drivable speed. For simplicity, the following description will explain the relationships among the driving voltage signal, the current signal and the BEMF of only one of the three phases, but other phases are similar, as one would understand by referring to the hollow circles in the figure. The zero-crossing point between the driving voltage signal Vu and the BEMF Bu shows that the BEMF Bu is ahead of the driving voltage signal Vu by $\Delta t1$, and the zero-crossing point between the driving voltage signal Vu and the BEMF Bu is behind the zero-crossing point of the driving voltage signal Vu with reference to ground by $\Delta t2$. A comparison between the zero-crossing point of the current signal Iu with reference to ground and the zero-crossing point of the driving voltage signal Vu with reference to ground shows that the current signal Iu is behind the driving voltage signal Vu by a delay time of $(L/R+\Delta t2)$. When the delay time is larger than the internal constant L/R, it means the rotation speed of the rotor has not yet reached the highest drivable speed, and the rotation speed can be further increased.

Referring to the aforementioned steps in FIG. 2, for the situation in FIG. 3B, the step S1 can detect the zero-crossing point of any current signal (one of Iu, Iv, and Iw) with reference to ground, and the step S2 calculates the time difference between the zero-crossing point of the current signal Iu, Iv, or Iw and the zero-crossing reference point (which is the zero-crossing point of the corresponding driving voltage signal with reference to ground). In FIG. 3B, the time difference is $(L/R+\Delta t2)$ and the predetermined value is L/R, so the time difference is higher than the predetermined value. According to the above result, a phase difference between the sensed current signal and the desired target current signal is $+\Delta t2$, which means that the rotation speed of the rotor has not yet reached the highest drivable speed, and therefore the rotation speed of the rotor can be increased according to the phase difference (step S3). For example, the phase switching frequencies of the driving voltage signals VU, Vv, and Vw can be increased to accelerate the rotation of the rotor.

Figure 3C:
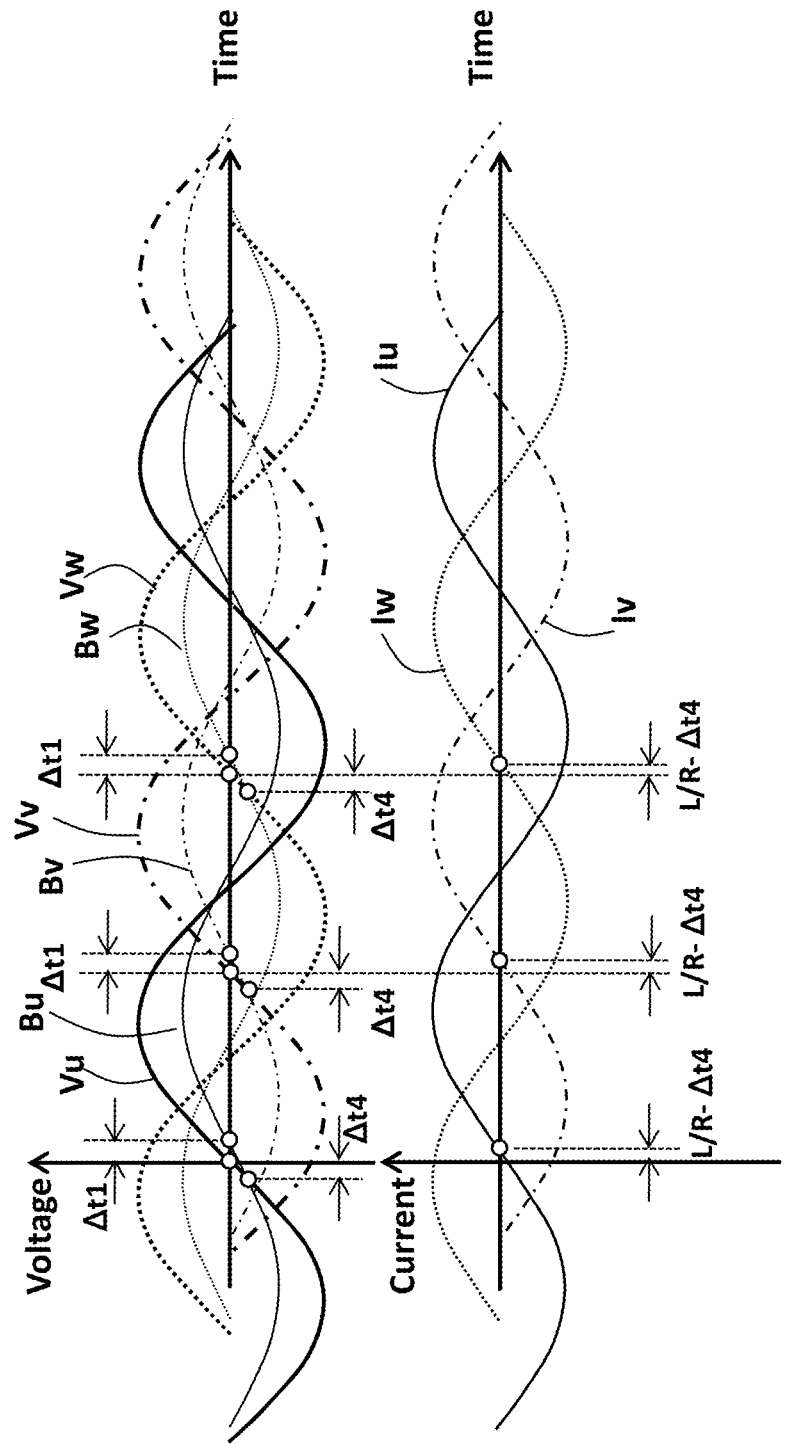

FIG. 3C shows the relationships among the driving voltage signals Vu, Vv, and Vw and the current signals Iu, Iv, and Iw when the rotor is rotating by a speed higher than the highest drivable speed that the driving voltage signals Vu, Vv, and Vw can afford. In this case, the phases of the BEMFs Bu, Bv, and Bw are behind the driving voltage signals Vu, Vv, and Vw. For simplicity, the following description will explain the relationships among the driving voltage signal, the current signal and the BEMF of only one of the three phases, but other phases are similar, as one would understand by referring to the hollow circles in the figure. The zero-crossing point between the driving voltage signal Vu and the BEMF Bu shows that the BEMF Bu is behind the driving voltage signal Vu by $\Delta t3$, and the zero-crossing point between the driving voltage signal Vu and the BEMF Bu is ahead of the zero-crossing point of the driving voltage signal Vu with reference to ground by $\Delta t4$. A comparison between the zero-crossing point of the current signal Iu with reference to ground and the zero-crossing point of the driving voltage signal Vu with reference to ground shows that the current signal Iu is behind the driving voltage signal Vu by a delay time of $(L/R-\Delta t4)$. When the delay time is smaller than the internal constant L/R, it means the rotation speed of the rotor has exceeded the highest drivable speed, and the rotation speed should be decreased.

Referring to the aforementioned steps in FIG. 2, for the situation in FIG. 3C, the step S1 can detect the zero-crossing point of any current signal (one of Iu, Iv, and Iw) with reference to ground, and the step S2 calculates the time difference between the zero-crossing point of the current signal Iu, Iv, or Iw and the zero-crossing reference point (which is the zero-crossing point of the corresponding driving voltage signal with reference to ground). In FIG. 3C, the time difference is $(L/R-\Delta t4)$. The predetermined value is L/R, so the comparison result shows that the phase difference between the current signal and the desired target current signal is $-\Delta t4$, and this means that the rotation speed of the rotor is higher than the highest drivable speed and should be correspondingly decreased (step S3). For example, the phase switching frequencies of the driving voltage signals Vu, Vv, and Vw can be reduced to lower down the rotation speed of the rotor.

Figure 3D:
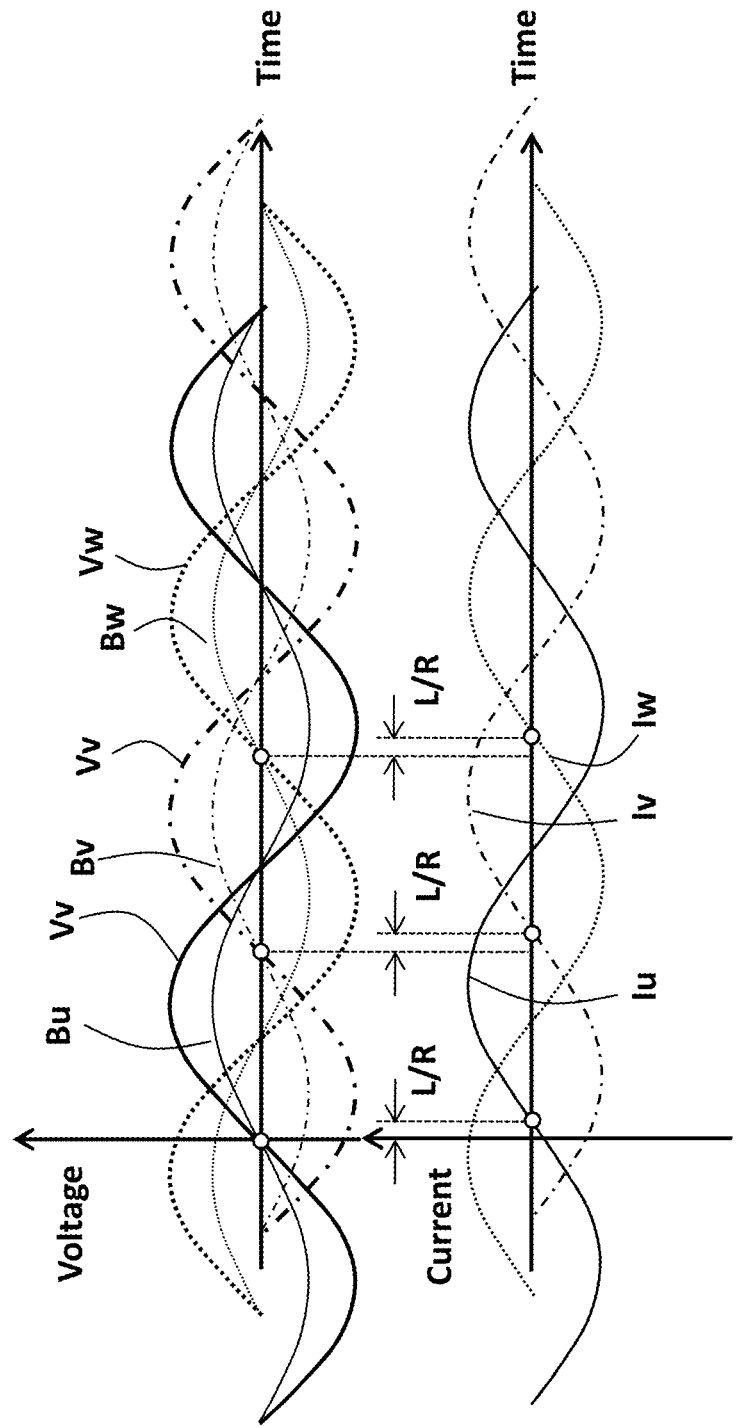

FIG. 3D shows the relationships among the driving voltage signals Vu, Vv, and Vw, the BEMFs Bu, Bv, and Bw, and the current signals Iu, Iv, and Iw when the rotor is rotating and the driving voltage signals Vu, Vv, and Vw are respectively in phase with the BEMFs Bu, By, and Bw. When the rotation speed is higher than this speed, the BEMFs Bu, By, and Bw will be behind the driving voltage signals Vu, Vv, Vw. For simplicity, the following description will explain the relationships among the driving voltage signal, the current signal and the BEMF of only one of the three phases, but other phases are similar, as one would understand by referring to the hollow circles in the figure. The zero-crossing point of the driving voltage signal Vu and the BEMF Bu shows that there is no phase difference between the driving voltage signal Vu and the BEMF Bu. In this case the time difference between the zero-crossing point of the current signal Iu with reference to ground and the driving voltage signal Vu with reference to ground is equal to the internal constant L/R. This is the optimum situation and should be maintained.

Referring to the aforementioned steps in FIG. 2, for the situation in FIG. 3D, the step S1 can detect the zero-crossing point of any current signal (one of Iu, Iv, and Iw) with reference to ground, and the step S2 calculates the time difference between the zero-crossing point of the current signal Iu, Iv, or Iw and the zero-crossing reference point (which is the zero-crossing point of the corresponding driving voltage signal with reference to ground). In FIG. 3D, the time difference is L/R, which is equal to the predetermined value is L/R, so the comparison result shows that the current signal is exactly the desired target current signal, and for example, the phase switching frequencies of the driving voltage signals can be maintained to keep the rotation speed of the rotor.

In the embodiments of FIGS. 3A-3D, the driving voltage signals are not limited to the sinusoidal waveforms as shown; for example, the signals can be in quasi-sinusoidal waveforms, in waveforms of pulse width modulation signals such as space vector pulse width modulation signals, or in other waveforms.

In the embodiment of FIGS. 3A-3D, the predetermined value is set as L/R, and the target is to control the phase difference between the current signal and the driving voltage signal to be maintained at L/R. This is only one preferred embodiment and for different applications or for practical considerations, the predetermined value can be set as another constant. For example, when the rotation friction is in concern, the predetermined value can be L/R plus a friction parameter. Certainly, the predetermined value can be adjusted according to other needs; for example, when the predetermined value is set to be equal to the internal constant L/R, if there is a sudden external resistive force, the rotor cannot afford extra torque to overcome it and the rotation speed of the rotor will quickly drop. Therefore, the target phase difference can be set a little higher or lower than the internal constant L/R; that is, the predetermined value can be set as (L/R+K), wherein K is a constant. If K is higher than 0, the rotation speed of the rotor is a little slower than the highest drivable speed but the rotation stability is better. If K is lower than 0, the rotation of the rotor may enter a weak magnetic control range wherein the rotor can rotate at the highest drivable speed, but the rotation is less stable. Of course, K can be set to zero.

Figure 3E:
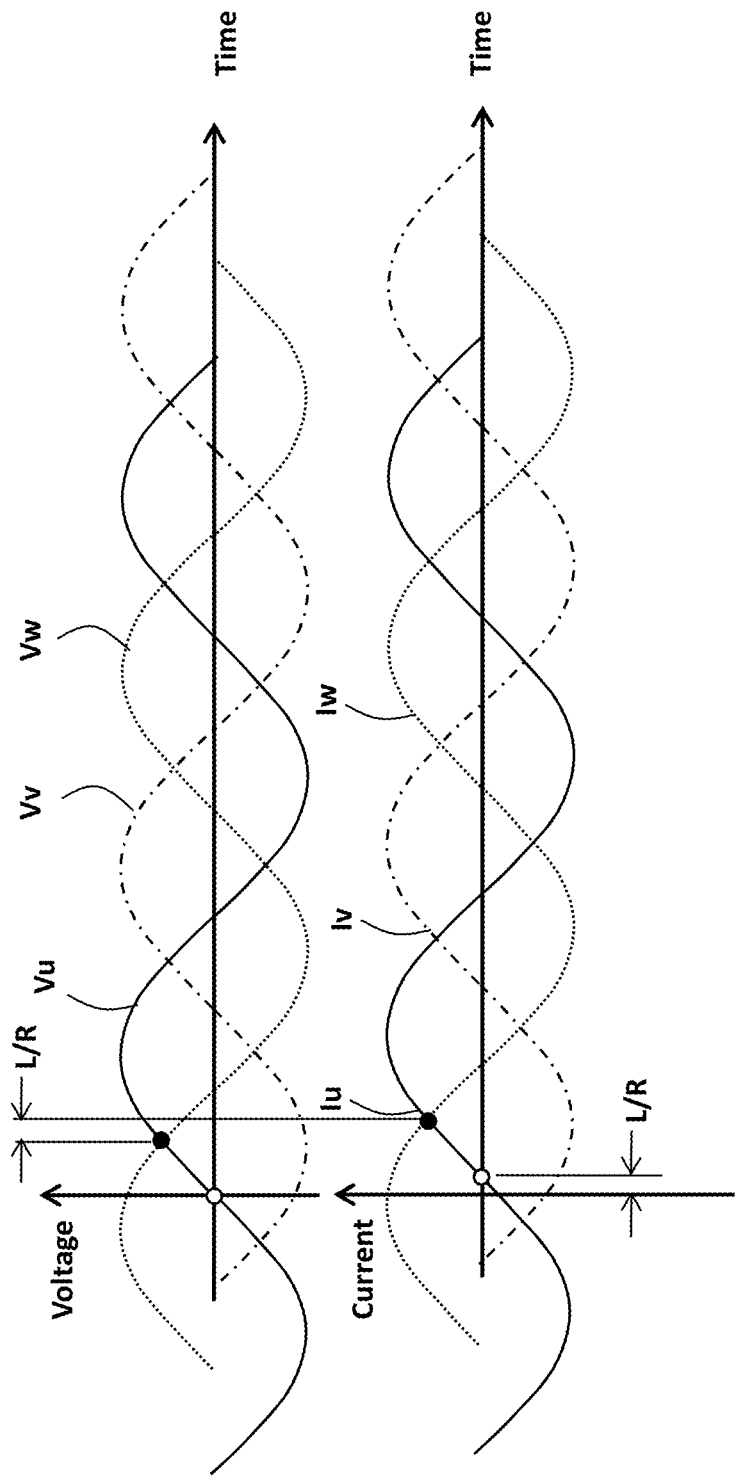
FIG. 3E shows different embodiments according to the zero-crossing point of the current signal of one phase and the differential zero-crossing point between the current signals of different phases.

The step of "comparing the zero-crossing point of the current signal with a zero-crossing reference point to determine a time difference" (S2) can be implemented in various ways. For example, the step can include: determining a zero-crossing reference point with reference to ground; sensing a current signal and detecting a zero-crossing point of the current signal with reference to ground; and comparing the zero-crossing reference point and the zero-crossing point to determine the time difference. Or, the step can include: determining a differential zero-crossing reference point between two current signals of two phases; detecting a differential zero-crossing point of the two current signals whereat one current signal crosses the other; and comparing the differential zero-crossing reference point and the differential zero-crossing point to determine the time difference. (Referring to FIG. 3E, the phase difference between the solid circles is equal to the phase difference between the hollow circles). The difference between the above two methods is that the former method is based on the zero-crossing point of the current signal with reference to ground, while the latter method is based on the intersection between two current signals. The results are equivalent but the related steps and circuits are different at some level.

FIGS. 4A-4D show the relationships of the signals according to another embodiment of the present invention. In the embodiment of FIGS. 3A-3D, the zero-crossing point is the intersection with ground, while in the embodiment of FIGS. 4A-4D, the differential zero-crossing point is the intersection between two phases.

Figure 4A:
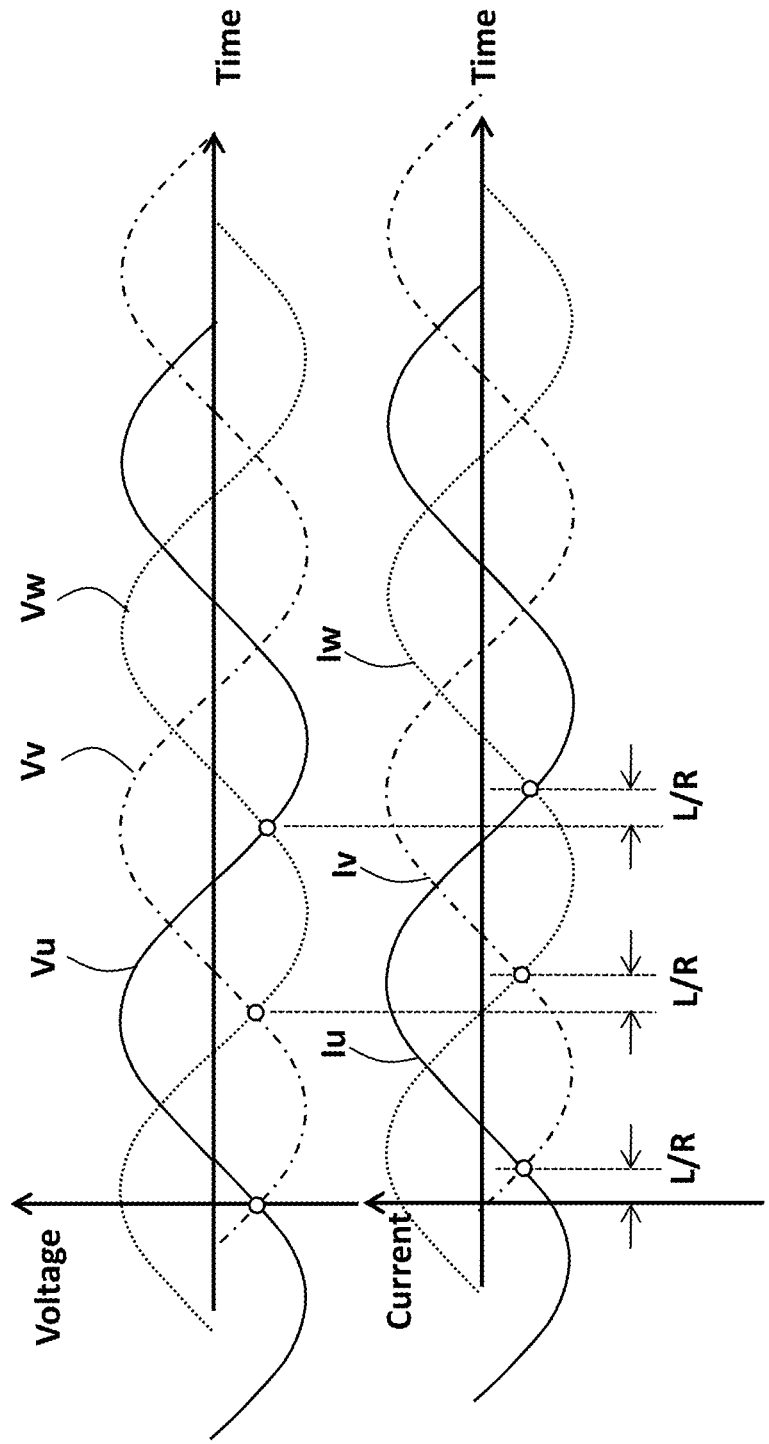
FIGS. 4A-4D show the relationships of various signals in the multi-phase motor control method according to another embodiment of the present invention.

Similar to FIG. 3A, FIG. 4A shows the signal relationships when the rotor is motionless; the current signals Iu, Iv, and Iw is behind the driving voltage signals Vu, Vv, and Vw by a delay time of L/R. But different from FIG. 3A, in FIG. 4A, the phase difference between the sensed current signal and the desired target current signal is obtained by comparing a differential zero-crossing point between two current signals (for example, the hollow circle at the intersection between Iu and Iv) and a differential zero-crossing reference point, wherein the differential zero-crossing reference point for example can be the intersection of the driving voltage signals of the corresponding phases (for example, the hollow circle at the intersection between Vu and Vv). When the rotor is motionless, the phase difference or delay time between the sensed current signal and the corresponding driving voltage signal is L/R, which is equal to the delay time between the differential zero-crossing point and the differential zero-crossing reference point.

Figure 4B:
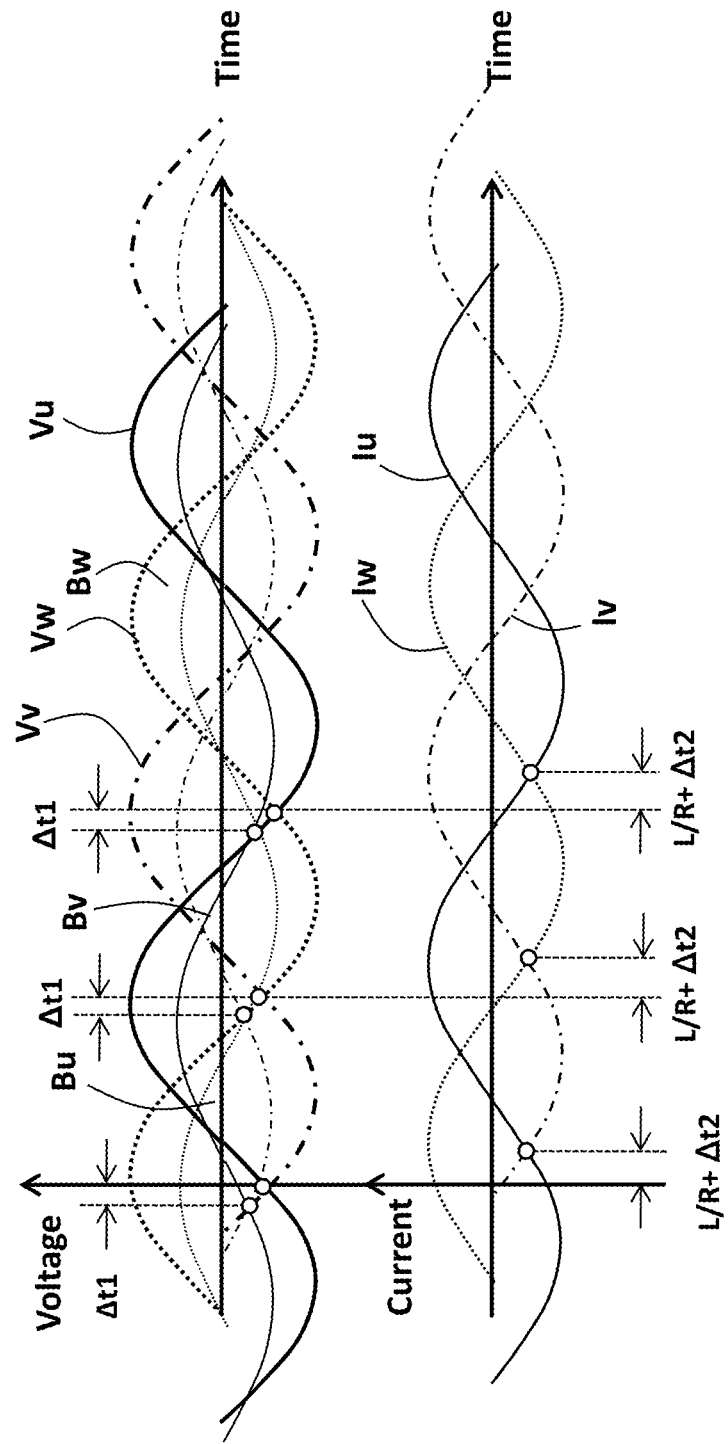

Similar to FIG. 3B, FIG. 4B shows the relationships among the driving voltage signals Vu, Vv, and Vw and the current signals Iu, Iv, and Iw when the rotor is rotating by a speed lower than the highest drivable speed that the driving voltage signals Vu, Vv, and Vw can afford. Detecting a differential zero-crossing point of two current signals corresponding to two phases (for example, the intersection between Iu and Iv) and comparing the differential zero-crossing point with a differential zero-crossing reference point (such as the intersection between the corresponding driving voltage signals Vu and Vv), the time difference between these two intersections can be obtained, which is the phase difference or the delay time between the sensed current signals with reference to the corresponding driving voltage signals, and it is (L/R+Δt2). That is, the difference between the sensed current signal and the desired target current signal is larger than the predetermined value L/R by +Δt2, and it means that the rotation speed of the rotor has not yet reached the highest drivable speed, so the rotation speed can be increased.

Figure 4C:
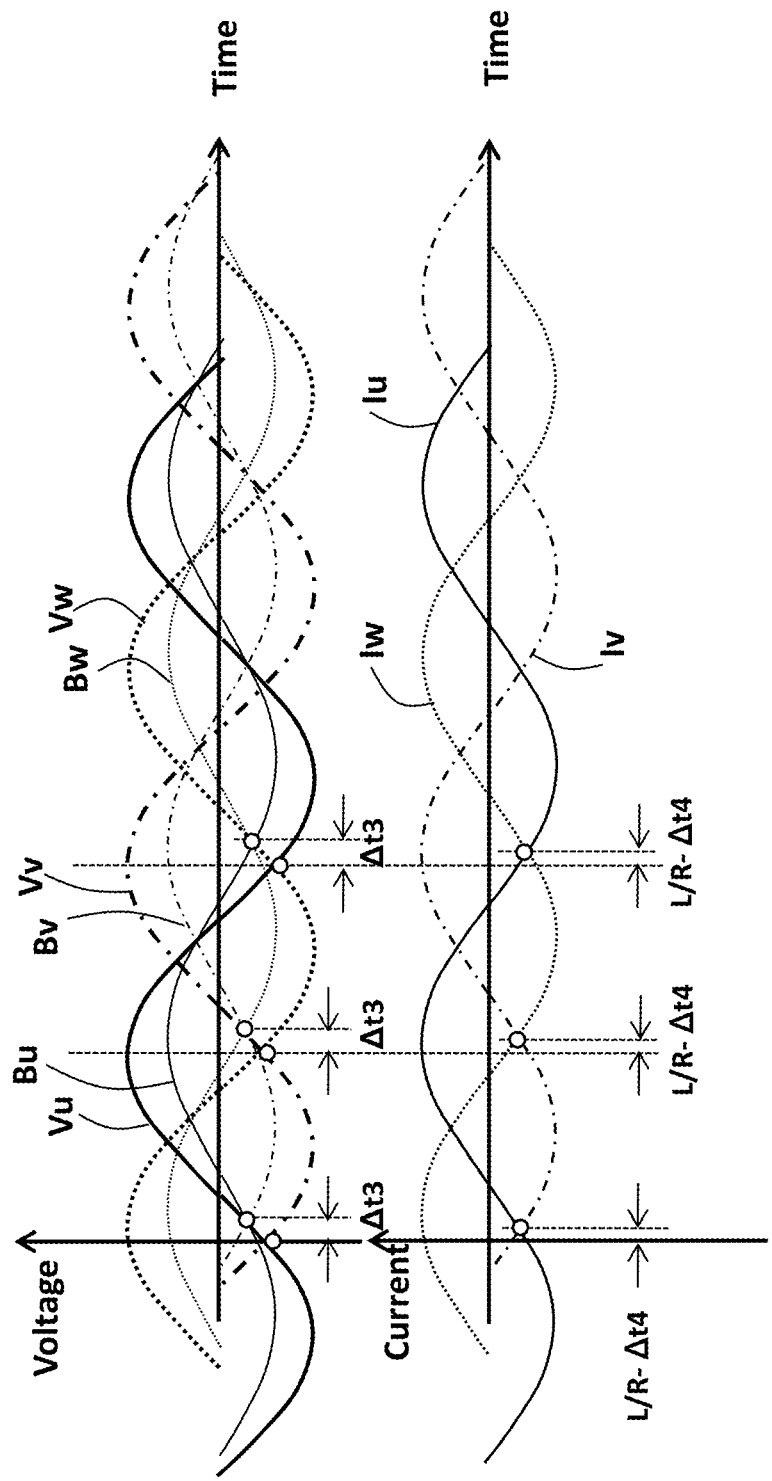

Similar to FIG. 3C, FIG. 4C shows the relationships among the driving voltage signals Vu, Vv, and Vw and the current signals Iu, Iv, and Iw when the rotor is rotating by a speed higher than the highest drivable speed that the driving voltage signals Vu, Vv, and Vw can afford. Detecting a differential zero-crossing point of two current signals corresponding to two phases (for example, the intersection between Iu and Iv) and comparing the differential zero-crossing point with a differential zero-crossing reference point (such as the intersection between the corresponding driving voltage signals Vu and Vv), the time difference between these two intersections can be obtained, which is the phase difference or the delay time between the sensed current signals with reference to the corresponding driving voltage signals, and it is (L/R−Δt4). That is, the difference between the sensed current signal and the desired target current signal is smaller than the predetermined value L/R by −Δt4, and it means that the rotation speed of the rotor has exceeded the highest drivable speed, so the rotation speed should be decreased.

Figure 4D:
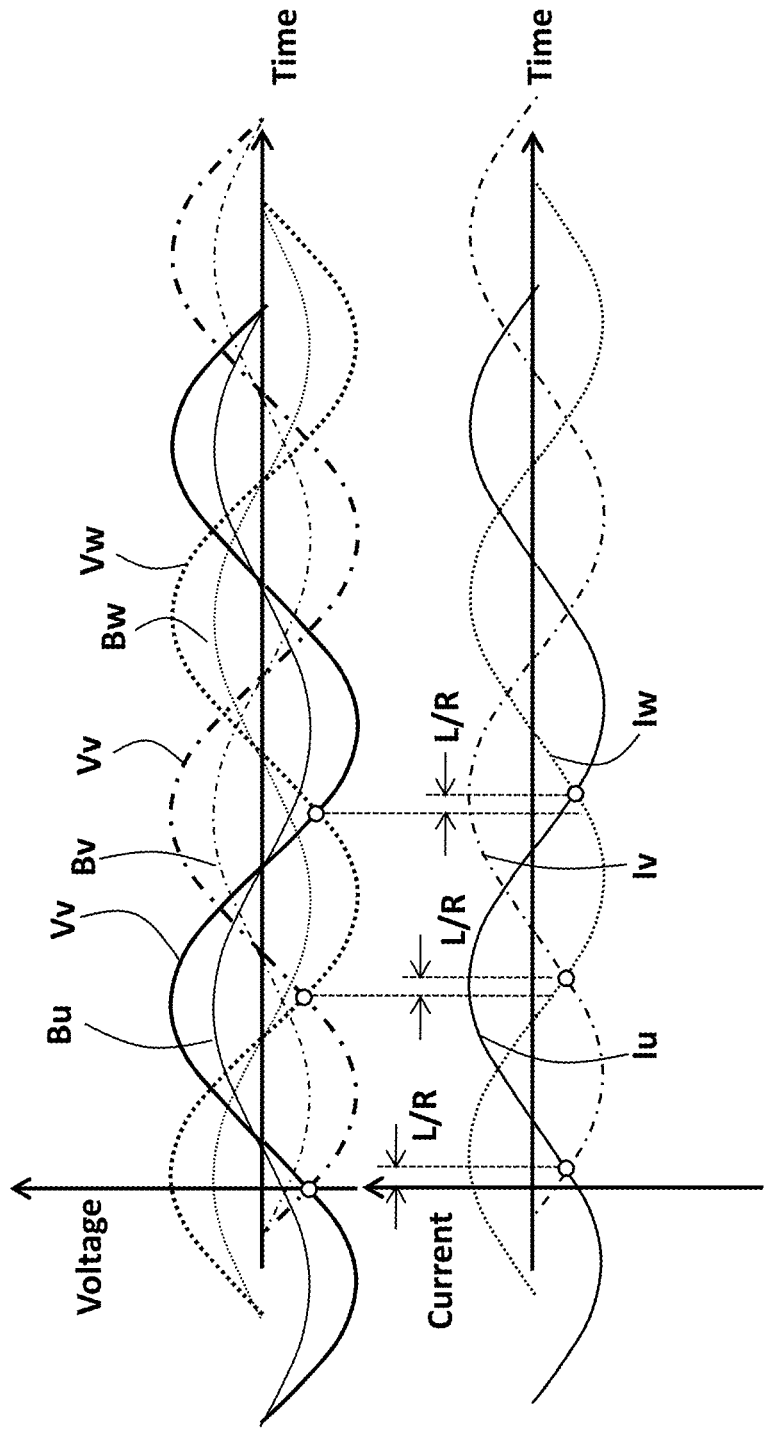

Similar to FIG. 3D, FIG. 4D shows the relationship among the driving voltage signals Vu, Vv, and Vw, BEMFs Bu, Bv, and Bw, and the current signals Iu, Iv, and Iw when the rotor is rotating and the driving voltage signals Vu, Vv, and Vw are respectively in phase with BEMFs Bu, Bv, and Bw. Detecting a differential zero-crossing point of two current signals corresponding to two phases (for example, the intersection between Iu and Iv) and comparing the differential zero-crossing point with a differential zero-crossing reference point (such as the intersection between the corresponding driving voltage signals Vu and Vv), the time difference between these two intersections can be obtained, which is the phase difference or the delay time between the sensed current signals with reference to the corresponding driving voltage signals, and it is L/R, indicating that the difference between the sensed current signal and the desired target current signal is zero, that is, the rotation speed of the rotor is optimum and should be maintained.

In the embodiment of FIGS. 4A-4D, the driving voltage signals are not limited to the sinusoidal waveforms as shown; for example, the signals can be in quasi-sinusoidal waveforms, in waveforms of pulse width modulation signals, or in other waveforms.

In the embodiment of FIGS. 4A-4D, the predetermined value is set as L/R, and the target is to control the phase difference between the current signal and the driving voltage signal to be maintained at L/R. This is only one preferred embodiment and for different applications or for practical considerations, the predetermined value can be set as another constant. As described in the above, the predetermined value can be set as (L/R+K), wherein K is a constant. If K is higher than 0, the rotation speed of the rotor is a little slower than the highest drivable speed but the rotation stability is better. If K is lower than 0, the rotation of the rotor may enter a weak magnetic control range wherein the rotor can rotate at the highest drivable speed, but the rotation is less stable. Of course, K can be set to zero.

Preferably, a start-up step can be performed to start-up the motor and afterward the steps S1-S3 of FIG. 2 are performed. In one embodiment, the 3-phase motor control method further includes: activating a 3-phase motor; sensing the rotation speed of the rotor; and switching to the aforementioned steps S1-S3 of FIG. 2 when the rotation speed reaches a predetermined speed. In this method, the rotation speed of the rotor can be sensed or measured by any means, such as by floating one of the phases and detecting a zero-crossing point of the BEMF. In another embodiment, the 3-phase motor control method further includes: activating a 3-phase motor; checking whether the zero-crossing point of the sensed current signal keeps behind the zero-crossing point of the desired target current signal; and switching to steps S1-S3 of FIG. 2 for controlling the rotation speed of the rotor when it is confirmed that the rotor has started rotating. In the second method, it is not necessary to sense or measure the rotation speed of the rotor; for example, the rotation of the rotor can be confirmed by open loop control as long as it can be sure that the rotor has started rotating.

If the predetermined value is set equal to the internal constant L/R, because the phase difference between the current signals and the driving voltage signals is the predetermined value L/R both when the rotor is locked when the rotor is rotating by the optimum speed, a mechanism is required to judge whether the rotor is locked or not. If the predetermined value is not equal to the internal constant, then such judging mechanism is not required.

Figures 5A, 5B:
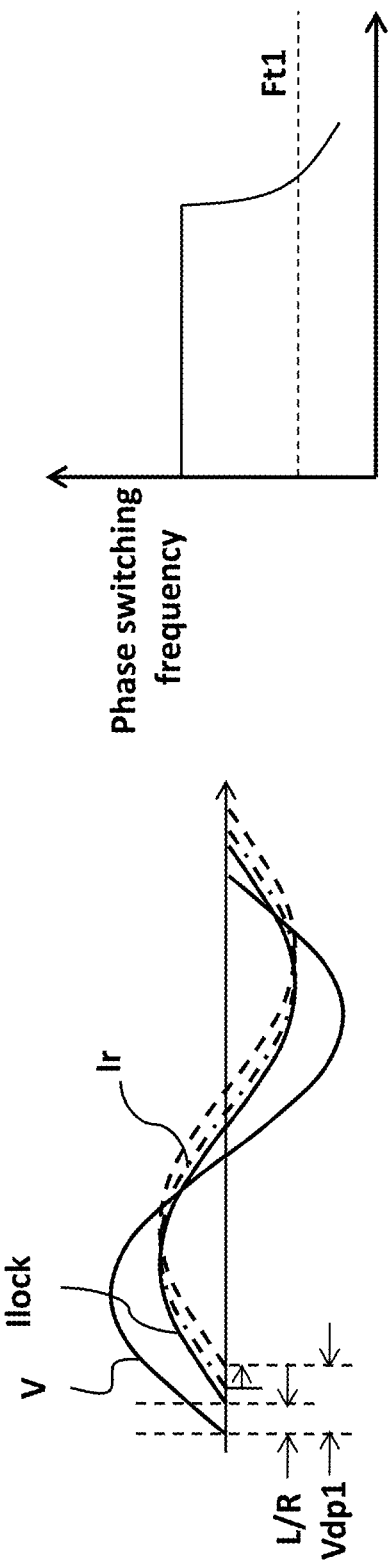
FIGS. 5A and 5B show a method to judge whether the rotor is locked according to an embodiment of the present invention.

FIGS. 5A and 5B show a method to judge whether the rotor is locked according to an embodiment of the present invention. The method according to this embodiment includes: comparing the phase difference between the current signal and the corresponding driving voltage signal with a predetermined phase difference Vdp1, wherein the predetermined phase difference Vdp1 is larger than the predetermined value L/R; controlling the phase switching frequency of the driving voltage signals according to the comparison result, such that the phase difference between the current signal and the driving voltage signal is close to or in phase with the predetermined phase difference Vdp1; and judging that the rotor of the 3-phase motor is locked when the phase switching frequency of the driving voltage signals declines to a threshold value Ft1.

Referring to FIG. 5A, the predetermined phase difference Vdp1 is larger than the predetermined value L/R. When the rotor is rotating, the time difference between the current signal Ir and the driving voltage signal V will change if the phase switching frequency changes. When the rotor is locked, the time difference between the locked current signal Ilock and the driving voltage signal V will not change if the phase switching frequency changes. Therefore, when the rotor is rotating, if the phase switching frequency of the driving voltage signal is decreased according to the comparing result, the time difference between the current signal Ir and the driving voltage signal V will become closer to the predetermined phase difference Vdp1 until the phase switching frequency of the driving voltage signal reaches a stable status. However if the rotor is locked, the time difference between the locked current signal Ilock and the driving voltage signal V will not become closer to the predetermined phase difference Vdp1 when the phase switching frequency of the driving voltage signal is decreased, and therefore the phase switching frequency of the driving voltage signal continues declining. Referring to FIG. 5B, when the phase switching frequency of the driving voltage signal declines to the threshold value Ft1, it can be determined that the rotor is locked.

Figures 6A, 6B:
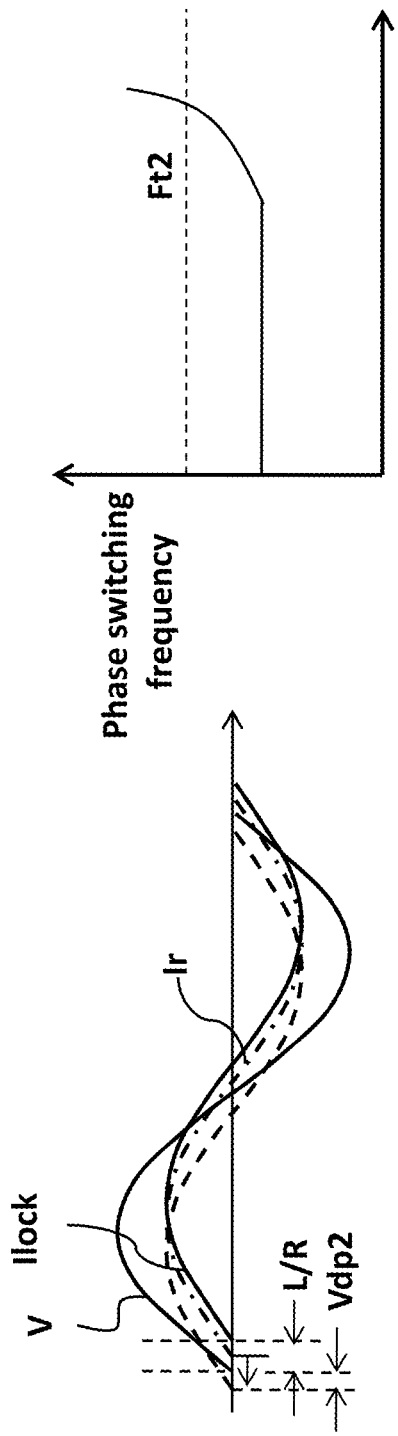
FIGS. 6A and 6B show a method to judge whether the rotor is locked according to another embodiment of the present invention.

FIGS. 6A and 6B show a method to judge whether the rotor is locked according to another embodiment of the present invention. The method according to this embodiment includes: comparing the phase difference between the current signal and the corresponding driving voltage signal with a predetermined phase difference Vdp2, wherein the predetermined phase difference Vdp2 is smaller than the predetermined value L/R; controlling the phase switching frequency of the driving voltage signals according to the comparison result, such that the phase difference between the current signal and the driving voltage signal is close to or in phase with the predetermined phase difference Vdp2; and judging that the rotor of the 3-phase motor is locked when the phase switching frequency of the driving voltage signals rises to a threshold value Ft1.

Referring to FIG. 6A, the predetermined phase difference Vdp2 is smaller than the predetermined value L/R. When the rotor is rotating, the time difference between the current signal Ir and the driving voltage signal V will change if the phase switching frequency changes. When the rotor is locked, the time difference between the locked current signal Ilock and the driving voltage signal V will not change if the phase switching frequency changes. Therefore, when the rotor is rotating, if the phase switching frequency of the driving voltage signal is increased according to the comparing result, the time difference between the current signal Ir and the driving voltage signal V will become closer to the predetermined phase difference Vdp2 until the phase switching frequency of the driving voltage signal reaches a stable status. However if the rotor is locked, the time difference between the locked current signal Ilock and the driving voltage signal V will not become closer to the predetermined phase difference Vdp2 when the phase switching frequency of the driving voltage signal is increased, and therefore the phase switching frequency of the driving voltage signal continues rising. Referring to FIG. 6B, when the phase switching frequency of the driving voltage signal rises to the threshold value Ft2, it can be determined that the rotor is locked.

Figure 7:
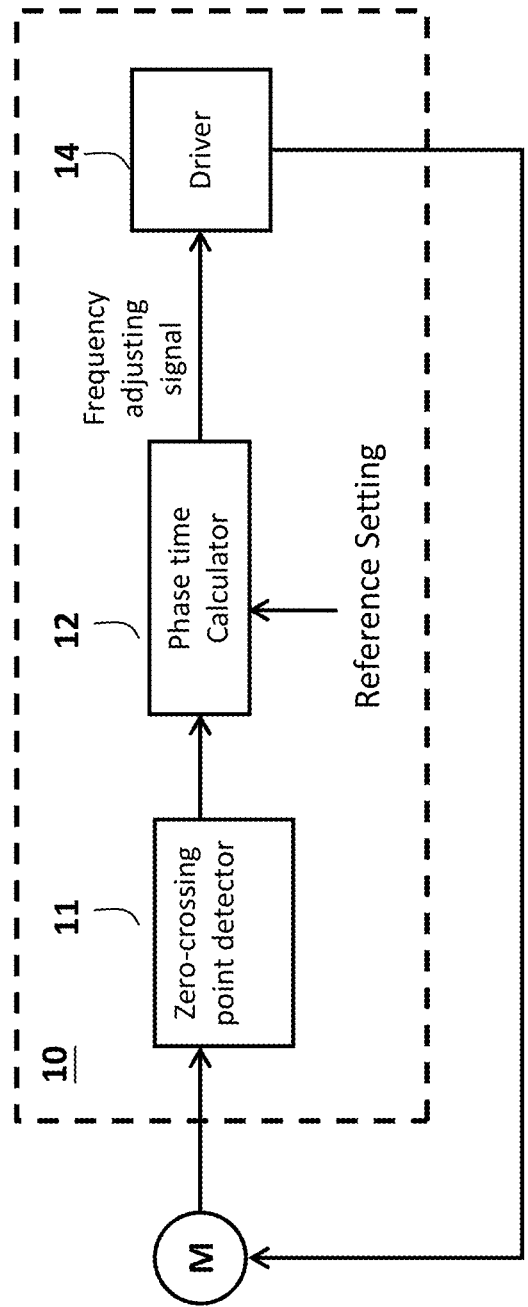
FIG. 7 shows a multi-phase motor control device according to an embodiment of the present invention.

Referring to FIG. 7, a 3-phase motor control device according to the present invention is provided for controlling a phase switching operation of a 3-phase motor M. The 3-phase motor M includes three nodes (not shown) respectively coupled to three driving voltage signals for controlling a rotation of a rotor (not shown). The 3-phase motor control device 10 includes: a zero-crossing point detector 11, receiving a current signal of one of the phases and detecting a zero-crossing point between the current signal and ground; a phase time calculator 12, calculating a time difference between the zero-crossing point of the current signal and a zero-crossing point between a desired target current signal and ground to obtain a phase difference between the current signal and the desired target current signal, and generating a frequency adjusting signal according to the phase difference; and a driver 14, controlling a rotation speed of the rotor according to the frequency adjusting signal. Note that the current signal does not have to be always sensed from the same phase; the 3-phase motor control device 10 can sense the current signal from a different phase at a different time point.

Figure 8:
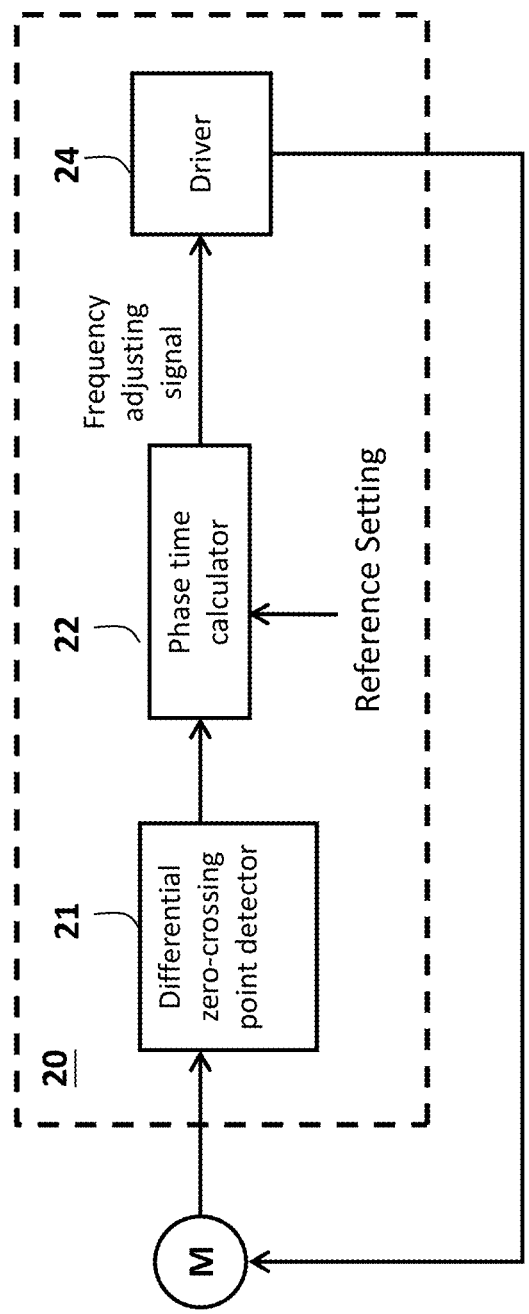
FIG. 8 shows a multi-phase motor control device according to another embodiment of the present invention.

Referring to FIG. 8, a 3-phase motor control device according to the present invention is provided for controlling a phase switching operation of a 3-phase motor M. The 3-phase motor M includes three nodes (not shown) respectively coupled to three driving voltage signals for controlling a rotation of a rotor (not shown). The 3-phase motor control device 20 includes: a differential zero-crossing point detector 21, detecting a differential zero-crossing point of two current signals of two phases; a phase time calculator 22, calculating a differential time difference between the differential zero-crossing point of the two current signals and a differential zero-crossing point of two desired target current signals to obtain a phase difference, and generating a frequency adjusting signal according to the phase difference; and a driver 24, controlling a rotation speed of the rotor according to the frequency adjusting signal. Note that the current signals do not have to be always sensed from the same two phase; the 3-phase motor control device 10 can sense the current signals from different phases at a different time point.

Compared with the prior art, the present invention does not need any floating phase to sense the BEMF after the motor has started-up and rotates. Therefore, the current signal waveforms are not deformed by the floating connection and are much better than the prior art. Furthermore, the present invention provides a mechanism to judge whether the motor (the rotor of the motor) is locked-motor, which is also superior to the prior art.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a circuit or a component which does not affect the primary function of the overall device can be inserted between two circuits or components shown to be in direction connection. For another example, the method and the device according to the present invention can be implemented in any multi-phase motor, not limited to a 3-phase motor. Therefore, all these and other modifications should fall within the scope of the present invention. An embodiment or a claim of the present invention does not need to attain or include all the objectives, advantages or features described in the above. The abstract and the title are provided for assisting searches and not to be read as limitations to the scope of the present invention.

What is claimed is:

1. A multi-phase motor control method for controlling a multi-phase motor which includes a plurality of nodes respectively receiving a corresponding number of driving voltage signals to control a rotation of a rotor in the multi-phase motor, the multi-phase motor control method comprising:
   sensing a current signal corresponding to one of the plurality of nodes and detecting a signal phase of the current signal;
   comparing the signal phase of the current signal with a reference phase of a desired target current signal which is obtained according to the driving voltage signals, to determine a phase difference; and
   adjusting a rotation speed of the rotor by adjusting phase switching frequencies of the driving voltage signals according to the comparing result.

2. The multi-phase motor control method of claim 1, wherein the driving voltage signals are sinusoidal driving voltage signals, or space vector pulse width modulation signals.

3. The multi-phase motor control method of claim 1, wherein the step of comparing the signal phase of the current signal with a reference phase of a desired target current signal to determine a phase difference comprises:
   detecting a zero-crossing point between the current signal and a ground;
   determining a zero-crossing point of the desired target current signal; and
   calculating a time difference between the zero-crossing points of the current signal and the desired target current signal to determine the phase difference.

4. The multi-phase motor control method of claim 3, wherein the zero-crossing point of the desired target current signal is equal to a zero-crossing point between the driving voltage signal corresponding to the current signal and the ground plus a predetermined value.

5. The multi-phase motor control method of claim 4, wherein the predetermined value is an internal constant or a sum of the internal constant and either a positive safety tolerance or a negative safety tolerance, and the internal constant is equal to an equivalent inductance of a wiring connected to the corresponding node divided by an equivalent resistance of the wiring.

6. The multi-phase motor control method of claim 1, wherein the step of comparing the signal phase of the current signal with a reference phase of a desired target current signal to determine a phase difference comprises:
   detecting a differential zero-crossing point between the current signal and another current signal corresponding to another node, wherein the differential zero-crossing point between the two current signals is an intersection between the two current signals;
   determining a differential zero-crossing point between the desired target current signal and another desired target current signal which correspond to the two current signals, wherein the differential zero-crossing point between the two desired target current signals is an intersection between the two desired target current signals; and
   calculating a time difference between the differential zero-crossing point between the two current signals and the differential zero-crossing point between the two desired target current signals to determine the phase difference.

7. The multi-phase motor control method of claim 6, wherein the differential zero-crossing point between the two desired target current signals is equal to a differential zero-crossing point between two of the driving voltage signals corresponding to the two current signals plus a predetermined value, wherein the differential zero-crossing point between two of the driving voltage signals is an intersection between the two driving voltage signals.

8. The multi-phase motor control method of claim 7, wherein the predetermined value is an internal constant or a sum of the internal constant and either a positive safety tolerance or a negative safety tolerance, and the internal constant is equal to an equivalent inductance of a wiring connected to the corresponding node divided by an equivalent resistance of the wiring.

9. The multi-phase motor control method of claim 1, wherein the step of controlling a rotation speed of the rotor according to the comparing result comprises:
   increasing the rotation speed of the rotor by increasing the phase switching frequencies of the driving voltage signals when the signal phase of the current signal is behind the reference phase of the desired target current signal; or
   decreasing the rotation speed of the rotor by decreasing the phase switching frequencies of the driving voltage signals when the signal phase of the current signal is ahead of the reference phase of the desired target current signal.

10. The multi-phase motor control method of claim 1, further comprising: activating the multi-phase motor; and performing the step of sensing the current signal corresponding to one of the plurality of nodes after it is confirmed that the rotor has started rotating.

11. The multi-phase motor control method of claim 1, further comprising: activating the multi-phase motor; sensing the rotation speed of the rotor; and performing the step of sensing the current signal corresponding to one of the plurality of nodes after the rotation speed reaches a predetermined speed.

12. The multi-phase motor control method of claim 1, further comprising:
   controlling the phase switching frequency of at least one of the driving voltage signals according to the comparison result of comparing the signal phase of the current signal and the reference phase of the desired target current signal, such that a zero-crossing point of the current signal is close to or in phase with a zero-crossing point of the desired target current signal, wherein the zero-crossing point of the desired target current signal is set to be larger than a zero-crossing reference point plus an internal constant of the multi-phase motor; and
   judging that the multi-phase motor is locked when the phase switching frequency of the driving voltage signal declines to a threshold value.

13. The multi-phase motor control method of claim 1, further comprising:
   controlling the phase switching frequency of at least one of the driving voltage signals according to the comparison result of comparing the signal phase of the current signal and the reference phase of the desired target current signal, such that a zero-crossing point of the current signal is close to or in phase with a zero-crossing point of the desired target current signal, wherein the zero-crossing point of the desired target current signal is set to be smaller than a zero-crossing reference point plus an internal constant of the multi-phase motor; and
   judging that the multi-phase motor is locked when the phase switching frequency of the driving voltage signal rises to a threshold value.

14. A multi-phase motor control device, coupled to a multi-phase motor with a plurality of nodes respectively receiving a corresponding number of driving voltage signals to control a rotation of a rotor in the multi-phase motor, the multi-phase motor control device comprising:
   a zero-crossing point detector, for receiving a current signal of one of the phases and detecting a zero-crossing point between the current signal and a ground;
   a phase time calculator, for calculating a time difference between the zero-crossing point of the current signal and a zero-crossing point between a desired target current signal and the ground to obtain a phase difference between the current signal and the desired target current signal, and generating a frequency adjusting signal according to the phase difference; and
   a driver, for adjusting a rotation speed of the rotor according to the frequency adjusting signal;
   wherein the desired target current signal is obtained according to the driving voltage signals.

15. A multi-phase motor control device, coupled to a multi-phase motor with three nodes respectively receiving three corresponding driving voltage signals to control a rotation of a rotor of the multi-phase motor, the multi-phase motor control device comprising:
   a differential zero-crossing point detector, for detecting a differential zero-crossing point of two current signals of two phases, wherein the differential zero-crossing point of the two current signals is an intersection between the two current signals;
   a phase time calculator, for calculating a differential time difference between the differential zero-crossing point of the two current signals and a differential zero-crossing point of two desired target current signals corresponding to the two current signals to obtain a phase difference, and generating a frequency adjusting signal according to the phase difference, wherein the differential zero-crossing point of the two desired target current signals is an intersection between the two desired target current signals; and
   a driver, for controlling a rotation speed of the rotor according to the frequency adjusting signal.

* * * * *